United States Patent Office 3,398,123
Patented Aug. 20, 1968

3,398,123
COPOLYMERS OF FLUOROALDEHYDES WITH ETHYLENICALLY UNSATURATED MONOMERS
Edward G. Howard, Jr., Hockessin, Del., assignor to E. I. du Pont de Nemours and Company, Wilmington, Del., a corporation of Delaware
No Drawing. Filed Nov. 9, 1964, Ser. No. 409,984
11 Claims. (Cl. 260—73)

ABSTRACT OF THE DISCLOSURE

Described and claimed are solid copolymers of certain polyfluoroaldehydes, e.g., perfluorobutanal-1, and certain ethylenically unsaturated compounds, e.g., ethylene, and their preparation by direct reaction between the precursors under free radical generating condition. The copolymers have the usual utilities of solid polymers.

FIELD OF THE INVENTION

This invention relates to, and has as its principal objects provision of, novel compositions of matter and the preparation of the same.

DETAILS OF THE INVENTION

The compositions of this invention are random copolymers formed by reacting together certain monomeric polyfluoroaldehydes and certain polymerizable monomeric ethylenically unsaturated compounds, the mole ratio of polyfluoroaldehyde component to ethylenic or vinyl component polymerized being from 0.001:1 to 1:1, and the resultant random copolymer being characterized by having a molecular weight of at least 1000, at least one of the groups

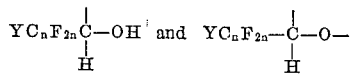

and at least 0.5% by weight of fluorine contributed by the fluoroaldehyde component. These copolymers are prepared by reacting together a mixture of the comonomers in the presence of a polymerization initiator capable of generating free radicals under the conditions of reaction.

SPECIFIC EMBODIMENTS OF THE INVENTION

The polyfluoroaldehydes which are employed to produce the present random copolymers, and which contribute the moiety called above the polyfluoroaldehyde component, are known compounds and have the formula $YC_nF_{2n}CHO$. In this formula, Y can be either hydrogen or fluorine and the subscript $n$ is a cardinal number from 1 to 12.

The polymerizable ethylenically unsaturated compounds reacted with the above polyfluoroaldehydes to produce the random copolymers of this invention have the formula, $H_2C=CXX'$. Here the X's may be the same or different and are selected from the group consisting of hydrogen, nitrile, carboxy, halogen of atomic number 9–35, alkyl, alkoxy, acyloxy, and carboalkoxy all of 1–18 carbons, carbonamido, i.e., —CONRR' wherein the R's, alike or different, are hydrogen or alkyl of 1–8 carbons, and aryl of 6–14 carbons. The formula of the resultant ethylenic moiety may be written as

Recurring units of this structure are found in the linear chains of the copolymer.

In a convenient method for preparing the above copolymers, a pressure reactor is charged with polyfluoroaldehyde and a polymerization initiator. The charged reactor is cooled, evacuated, and ethylenically unsaturated compound is added. The charged reactor is then maintained between —80° and 250° C., until there is no further reaction, as evidenced by cessation of pressure drop. If desired, the pressure within the reactor can be maintained by addition of ethylenically unsaturated compound. After reaction is complete, the reactor is allowed to cool, opened, and the contents are discharged. The desired polymer is isolated by methods known to those skilled in the art.

Examples of specific polyfluoroaldehydes of formula $YC_nF_{2n}CHO$, in which Y and $n$ are as above, usable in the present process are trifluoroacetaldehyde, difluoroacetaldehyde, hexafluorobutyraldehyde, heptafluoroisobutyraldehyde, octafluoropentanal-1, n-nonafluorovaleraldehyde, 6H-decafluorohexanal-1, 9H-hexadecafluorononanal-1, perfluorododecanal-1, and the like. In place of the aldehydes, it is to be understood that the corresponding hydrates and alcoholates can be used equally as well.

Exemplary ethylenically unsaturated compounds of formula $H_2C=CXX'$, in which X and X' have the aforementioned meanings, are ethylene, propylene, isobutylene, vinyl chloride, vinylidene chloride, vinyl fluoride, vinylidene fluoride, vinyl acetate, vinyl propionate, vinyl stearate, acrylic and methacrylic acids, acrylic and methacrylic esters, e.g., methyl, ethyl, propyl, and butyl acrylates and methacrylates, acrylamide and methacrylamide, N-alkyl and N,N-dialkyl acrylamides and methacrylamides, e.g., N-methyl and N,N-dimethyl acrylamide and methacrylamide, acrylonitrile, vinylidene cyanide, styrene, 1-methyl styrene, and the like. Other ethylenic compounds which can be used are ethylene glycol diacrylate, polyethylene glycol dimethacrylate, allyl and methallyl acrylates and methacrylates, divinyl succinate, and the like.

The preferred ethylenically unsaturated compounds of formula $H_2C=CXX'$ are those in which both X's are hydrogen or one of the X's is hydrogen and the other is phenyl, halogen such as fluorine or chlorine, nitrile, or acyloxy.

The polyfluoroaldehyde and vinyl compound can be copolymerized in a wide range of proportions ranging from 0.001 to 1.0 mole of polyfluoroaldehyde per mole of ethylenic compound. However, the polyfluoroaldehyde may be used in larger amounts to function both as a reactant and as a reaction medium, if desired.

Although not essential, a reaction medium is usually employed in order to bring about better contact between the reactants, particularly in the absence of an excess of one reactant. Suitable reaction media are benzene, fluorocarbons, e.g., perfluorocyclobutane, dichlorotetrafluoroethane, dichlorodifluoromethane, perfluorobutylperfluorotetrahydrofuran, bis(perfluoromethyl)benzyl alcohol, hexafluoroisopropanol, carbon bisulfide, diphenyl, water, etc. The choice of reaction medium will depend upon the particular perfluoroaldehyde and ethylenic compound being reacted.

As noted above, the instant reaction must be carried out in the presence of an initiator. The initiators employed are those capable of generating free radicals under the reaction conditions and any compound which generates free radicals under the conditions of reaction can be used, preferred types being peroxides (or peroxy compounds) and azonitriles. Exemplary peroxy compounds are benzoyl peroxide, lauroyl peroxide, dimethyl peroxide, diethyl peroxide, di-t-butyl peroxide, dioctadecyl peroxide, succinoyl peroxide, acetyl peroxide, hydrogen peroxide, tetralin peroxide, urea peroxide, peracetic and perbenzoic acids, alkali metal persulfates, perborates, and percarbonates, alone and in a combination with a reducing agent, 1,1′ - azodicyclohexanecarbonitrile, α,α′ - azobis(α-cyclopropylpropionitrile), α,α′ - azobis(isobutyronitrile), α,α′-azobis(α,γ - dimethylvaleronitrile), α,α′ - azobis(α-methyleneanthronitrile), α,α′-azobis(α-phenylpropionitrile), α,α′-azobis(α - cyclohexylpropionitrile), α,α′ - azobis(α-isopropyl - β - methylbutyronitrile), α,α′-azobis(α-methyl-γ-carboxybutyronitrile), sodium γ,γ′-azobis (γ-cyanovalerate), 1,1′-azodicamphanecarbonitrile, etc.

The amount of initiator employed depends upon the particular reactants being copolymerized, the temperature selected for operation, etc. As a rule, the amount is at least 0.001% by weight of the polyfluoroaldehyde used. Most generally, however, 0.01% by weight of the polyfluoroaldehyde is adequate to promote the reaction at a satisfactory rate. The upper limit of initiator is not critical and use of more than 20% of initiator by weight of the polyfluoroaldehyde has no advantage and this represents a practical upper limit.

The polymerization can also be initiated using such other sources of free radicals as actinic light, combinations of actinic light with diketones, high energy radiation, benzoin plus actinic light, etc.

The reaction temperature and pressure can vary over wide limits. Thus, the temperature can be as low as $-80°$ C. with very active free-radical generating initiators, or as high as 250° C., when initiators are used which require high temperatures for activation. As a rule, good reaction rates are obtained with peroxide and azonitrile initiators at temperatures in the range of 40° to 150° C. The process is generally carried out within this temperature range when initiators of the aforementioned kind are used.

The pressure employed depends upon the nature of the ethylenic compound, the temperature, and the initiator used. With normally gaseous ethylenic compounds, it is customary to charge the reactor with the polyfluoroaldehyde, reaction medium, if any, and catalyst, thereafter inject the gaseous olefin to a predetermined pressure at reaction temperature, and maintain these conditions until the desired amount of gaseous ethylenic compound has been consumed. With normally liquid olefins, usually an amount is added which is at least molar equivalent of the polyfluoroaldehyde. The reactor is then closed and the charge is heated under autogenous pressure. With normally solid ethylenic compounds, the ethylenic compound may be added to the polyfluoroaldehyde as such or as a solution or dispersion in a suitable inert reaction medium. The pressure used is suitably that which develops under the conditions of reaction, but increased pressures may be used.

The reaction is generally continued until there is no further pressure drop. In some cases it is desirable to add the ethylenic compound incrementally and to continue the addition until there is no further pressure drop. This mode of operation is particularly desirable with reactants whose reactivity is so high that moderation is desirable under the conditions used, or with reactants that tend to be unstable.

The material out of which the reactor is built is important only to the extent that it should be one which is resistant to corrosion, that it should not promote undesired side reactions, and that it should be capable of resisting the temperature and pressure conditions used. Stainless steels, as well as silver-lined pressure reactors, glass, etc., are satisfactory and are usually employed.

SPECIFIC EMBODIMENTS OF THE INVENTION

The examples which follow are submitted to illustrate and not to limit this invention.

Example 1

Copolymerization of $CF_3CF_2CF_2CHO$ with ethylene.—
A. A silver-lined reactor was charged with 35 g. of perfluorobutanal-1 hydrate, $CF_3CF_2CF_2CHO.H_2O$, and 0.2 g. α,α′-azobis(isobutyronitrile). The reactor was closed, cooled to 0° C., evacuated, and pressured to between 500 and 600 atmospheres with ethylene at 70° C. In a 16-hour reaction period, there was an observed pressure drop of 80 atmospheres. The reactor was allowed to cool, opened, and the contents discharged. The polymeric product obtained was washed in boiling water for 2 hours, the water being changed three times during this boiling period. There resulted 20 g. of a white, sticky, rubbery solid polymer, which was soluble in cold benzene and in warm hexane. Polymer separated from the hexane solution on cooling. A sample of the product was dissolved in warm hexane, reprecipitated by cooling, and dried at 100° C./0.2 mm. This product analyzed 30.23% F. and had an $\eta_{inh}$, as a 0.1% solution in tetrahydronaphthalene at 125° C., of 0.57.

Infrared analysis showed strong —OH absorption at $2.9\mu$, and strong C–F absorption in the $8$–$11\mu$ region.

B. A solution was made up from 2 g. of polymethylmethacrylate and 2 g. of the ethylene-perfluorobutanal-1 copolymer, prepared as described above, in 25 ml. of chloroform at 25° C. A sparkling, transparent, colorless film that was strong and very flexible was cast from this solution. In contrast, polymethyl methacrylate films are brittle.

The ethylene-perfluorobutanal-1 copolymer was pressed to strong films (4 mils) that could be creased repeatedly without breaking.

Example 2

Copolymerization of $CF_3CHO$ with ethylene.—A reactor made of a nickel, iron, molybdenum alloy was charged with 50 g. of perfluoroacetaldehyde hydrate, $CF_3CHO.H_2O$, and 0.15 g. of a 75% solution of t-butyl peroxypivalate in mineral spirits. The reactor was closed, cooled, evacuated, and pressured with ethylene so that at 45° C. the pressure was 600 atmospheres. After two hours at 46° C. and 16 hours at 50° to 55° C., there was an observed pressure drop of 45 atmospheres. The reactor was allowed to cool, opened, and the contents discharged. There resulted 1 g. of polymer which was washed with water and dried at 100° C./0.2 mm. The polymer analyzed 8.31% F. Infrared analysis on a film pressed from the polymer showed strong absorption for —OH at $2.78\mu$ and $2.9\mu$ and for C–F in the $8\mu$ range.

Example 3

Copolymerization of $CF_3CHO$ with vinyl fluoride.—
Commercial perfluoroacetaldehyde hydrate was freed from the water of hydration by adding it to a phosphorus pentoxide-sulfuric acid mixture. The gaseous perfluoroacetaldehyde obtained was collected in a trap cooled by solid carbon dioxide-acetone mixture. It was distilled into enough water to give perfluoroacetaldehyde monohydrate, $CF_3CHO.1H_2O$. A conditioned stainless steel reactor was charged with 24 g. of this hydrate, 0.15 g. of a 75% solution in mineral spirits of t-butyl peroxypivalate and 30 g. of vinyl fluoride. The reactor was shaken at 45° C. for 2 hours, 50° C. for 3 hours, and at 55° C. for 3 hours. There resulted 10 g. of polymer, which after drying at 100° C./0.2 mm. could be pressed at 180° C. to a brittle trum of the polymer on a potassium bromide wafer showed absorption of $2.8\mu$ characteristic of the —OH group and at $8$–$10\mu$ indicating the presence of C–F and/or C—O—.

Example 4

Copolymerization of $H(CF_2)_8CHO.H_2O$ with vinyl acetate.—A heat-resistant glass reactor was charged with 20 mg. benzoyl peroxide, 1 g. of 9H-hexadecafluorononanal-1 hydrate, $H(CF_2)_8CHO \cdot H_2O$, and 2 ml. of vinyl acetate (freshly distilled). The reactor was sealed after flushing with $N_2$ and evacuating while at $-78°$ C. and the charge heated at 83° to 73° C. for 4 hours. The resulting polymer was dissolved in methanol and precipitated by adding the solution to water. There resulted 1.0 g. of solid polymer which, when dried at 100° C./0.2 mm., analyzed 18.15% F. and was transparent, pale amber in color, flexible, and strong.

Example 5

Copolymerization of H(CF$_2$)$_8$CHO·H$_2$O with acrylonitrile.—This experiment was carried out as described in Example 4, except that 2 ml. of acrylonitrile was used in place of the vinyl acetate. The resulting white polymer was washed with methanol and dried at 100° C./0.2 mm. It weighed 1.8 g. and analyzed 1.98% F.

Example 6

Copolymerization of H(CF$_2$)$_8$CHO·H$_2$O with styrene.—This experiment was carried out as described in Example 4, except that 2 ml. of styrene was used in place of the vinyl acetate. The polymer obtained was dissolved in benzene and precipitated by adding the solution to methanol. There resulted 1.0 g. of white solid polymer which, when dried at 100° C./0.2 mm. analyzed 2.15% F. It was pressed at 130° C. to a hard, white, translucent, brittle film.

As illustrated in Example 1, the products are useful modifiers for other polymeric materials, imparting improved flexibility thereto. The polymers can also be pressed to films which are useful as protective coatings.

Since obvious modifications and equivalents in the invention will be evident to those skilled in the chemical arts, I propose to be bound solely by the appended claims.

The embodiments of the invention in which as exclusive property or privilege is claimed are defined as follows:

1. A solid polymer formed by reacting a monomeric mixture consisting essentially of
   (A) from 0.001 to 1.0 mole of a fluoroaldehyde of the formula $$YC_nF_{2n}CHO$$

wherein Y is selected from the group consisting of hydrogen and fluorine and the subscript $n$ is an integer from 1 to 12, and
   (B) 1 mole of a monoethylenic compound of the formula $$H_2C=CXX'$$

wherein X and X' are selected from the group consisting of hydrogen, nitrile, carboxy, halogen of atomic number 9–35, alkyl, alkoxy, acyloxy, and carboalkoxy of 1–18 carbons, carbonamido —CONRR', R and R' being selected from the group consisting of hydrogen and alkyl of 1–8 carbons, and aryl of 6–14 carbons in the presence of a free radical initiator, said polymer being characterized by having a molecular weight of at least 1000 and at least 0.5% by weight of fluorine contributed by (A).

2. A solid copolymer of claim 1 formed by reacting a monomeric mixture of perfluorobutanal-1 and ethylene.

3. A solid copolymer of claim 1 formed by reacting a monomeric mixture of perfluoroacetaldehyde and ethylene.

4. A solid copolymer of claim 1 formed by reacting a monomeric mixture of perfluoroacetaldehyde and vinyl fluoride.

5. A solid copolymer of claim 1 formed by reacting a monomer mixture of 9H-hexadecafluorononanal-1 and vinyl acetate.

6. A solid copolymer of claim 1 formed by reacting a monomeric mixture of 9H-hexadecafluorononanal-1 and acrylonitrile.

7. A solid copolymer of claim 1 formed by reacting a monomeric mixture of 9H-hexadecafluorononanal-1 and styrene.

8. The process which comprises reacting together, under free radical-generating conditions and at a temperature in the range —80° to 250° C.,
   (A) a monomer of the formula $$YC_nF_{2n}CHO$$

wherein Y is selected from the group consisting of hydrogen and fluorine and $n$ is an integer from 1 to 12, and
   (B) a monomer of the formula $$H_2C=CXX'$$

wherein X and X' are selected from the group consisting of hydrogen, nitrile, carboxy, halogen of atomic number 9–35, alkyl, acyloxy, alkoxy and carboalkoxy of 1–18 carbons, carbonamido —CONRR', R and R' being selected from the group consisting of hydrogen and alkyl of 1–8 carbons, and aryl of 6–14 carbon,
the mole ratio of polyfluoroaldehyde component to ethylenic component being in the range 0.0001:1 to 1:1.

9. A polymer of claim 1 in the form of a self-supporting film.

10. A copolymer of ethylene and perfluorobutanal-1 in the form of a self-supporting film.

11. A copolymer of styrene and 9H-hexadecafluorononanal-1 in the form of a self-supporting film.

References Cited

UNITED STATES PATENTS

| | | | |
|---|---|---|---|
| 2,568,500 | 9/1951 | Husted et al. | 260—601 |
| 2,723,999 | 11/1955 | Cowen et al. | 260—633 |
| 2,732,370 | 1/1956 | Codding | 260—633 |
| 2,828,287 | 3/1958 | Cairns et al. | 260—67 |

JOSEPH L. SCHOFER, *Primary Examiner.*

J. C. HAIGHT, *Assistant Examiner.*

UNITED STATES PATENT OFFICE
CERTIFICATE OF CORRECTION

Patent No. 3,398,123                              August 20, 1968

Edward G. Howard, Jr.

It is certified that error appears in the above identified patent and that said Letters Patent are hereby corrected as shown below:

Column 4, line 61, after "brittle" insert -- film. This polymer analyzed 42.1% F. An infrared spec- --.

Signed and sealed this 13th day of January 1970.

(SEAL)
Attest:

Edward M. Fletcher, Jr.                      WILLIAM E. SCHUYLER, JR.
Attesting Officer                               Commissioner of Patents